US012646042B2

(12) United States Patent
Kumar et al.

(10) Patent No.: US 12,646,042 B2
(45) Date of Patent: Jun. 2, 2026

(54) ENHANCING TRANSACTIONS WITH LOCATION-BASED INSIGHTS ON PAYMENT MODES

(71) Applicant: MASTERCARD INTERNATIONAL INCORPORATED, Purchase, NY (US)

(72) Inventors: Vinay Kumar, Pune (IN); Ashutosh Chaturvedi, Pune (IN); Naveen Kumar Singh, Pune (IN); Sachin Kumar Singh, Pune (IN); Selwyn Santan Fernandes, Pune (MH); Shravani Sunil Shilimkar, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 121 days.

(21) Appl. No.: 18/427,808

(22) Filed: Jan. 30, 2024

(65) Prior Publication Data

US 2025/0245643 A1     Jul. 31, 2025

(51) Int. Cl.
*G06Q 20/22*          (2012.01)
*G06Q 20/20*          (2012.01)
*H04W 4/021*         (2018.01)

(52) U.S. Cl.
CPC ........... *G06Q 20/227* (2013.01); *G06Q 20/20* (2013.01); *H04W 4/021* (2013.01)

(58) Field of Classification Search
CPC .. G06Q 20/227; G06Q 20/20; G06Q 20/4012; G06Q 20/405; G06Q 30/0261; G06Q 30/0259; G06Q 30/0251; H04W 4/021; G06F 3/0325; G06F 3/038; G06F 17/60; G01C 21/3476

USPC .......... 705/1.1, 2, 3, 7.25, 7.34, 7.39, 14.19, 705/14.23, 14.27, 14.51, 14.56, 26.7, 705/26.8, 36 R, 37, 39, 41, 44, 64, 325; 701/438; 600/301, 587, 595; 702/19
See application file for complete search history.

(56) References Cited

U.S. PATENT DOCUMENTS 11,887,147 B1 *   1/2024   Jacoby ............... G06Q 30/0238
2004/0249712 A1 *  12/2004   Brown ............... G06Q 30/0217
                                                705/14.19

(Continued)

OTHER PUBLICATIONS

Unknown, "Enrichment Engine", Contovista, copyright 2023, 5 pages.

(Continued)

*Primary Examiner* — Hani M Kazimi
*Assistant Examiner* — Sanjeev Malhotra
(74) *Attorney, Agent, or Firm* — Barta Jones, PLLC

(57)          ABSTRACT
A user interface provides insights with respect to modes of payments offered by merchants within a particular region of interest defined by a user in the user interface. Historic and real time transaction data are obtained and merged to create integrated records. Location information and payment modes for merchants are obtained from the integrated records. The location information and payment modes for merchants within a defined region of interest are automatically arranged in the user interface enabling the user to view, on a map and at a glance, a location of the merchants, which merchants offer particular modes of payment, and a success rate for the particular modes of payment for the merchants within the region of interest.

20 Claims, 11 Drawing Sheets

(56) References Cited

U.S. PATENT DOCUMENTS

| | | | | |
|---|---|---|---|---|
| 2008/0268868 | A1* | 10/2008 | Maitland | H04L 67/306 705/1.1 |
| 2009/0327151 | A1* | 12/2009 | Carlson | G06Q 30/0252 705/14.23 |
| 2011/0172562 | A1* | 7/2011 | Sahasrabudhe | A61B 5/742 600/587 |
| 2011/0172567 | A1* | 7/2011 | Panken | A61B 5/7475 702/19 |
| 2012/0011063 | A1* | 1/2012 | Killian | G06Q 20/349 705/41 |
| 2013/0275300 | A1* | 10/2013 | Killian | G06Q 20/40 705/41 |
| 2014/0012691 | A1* | 1/2014 | Hanson | G06Q 20/42 705/44 |
| 2014/0052524 | A1* | 2/2014 | Andersen | G06Q 30/0207 705/14.27 |
| 2014/0052615 | A1* | 2/2014 | Andersen | G06Q 30/0226 705/39 |
| 2014/0058289 | A1* | 2/2014 | Panken | G16H 50/20 600/595 |
| 2015/0058225 | A1* | 2/2015 | Matthews | G06Q 20/405 705/44 |
| 2015/0186952 | A1* | 7/2015 | Brown | H04L 43/065 705/14.56 |
| 2015/0287064 | A1* | 10/2015 | Weis | G06Q 30/0205 705/7.34 |
| 2015/0356556 | A1* | 12/2015 | Celikyilmaz | G06Q 20/3224 705/14.51 |
| 2015/0371335 | A1* | 12/2015 | Liptak | G06Q 40/02 705/36 R |
| 2016/0095546 | A1* | 4/2016 | Sahasrabudhe | G16H 50/20 600/301 |
| 2016/0169696 | A1* | 6/2016 | Butts, III | G06Q 30/0259 701/438 |
| 2016/0180460 | A1* | 6/2016 | Rooney | G06Q 40/04 705/37 |
| 2016/0210606 | A1* | 7/2016 | Henderson | G06Q 20/204 |
| 2017/0083913 | A1* | 3/2017 | Matthews | G06Q 20/409 |
| 2017/0098209 | A1* | 4/2017 | Laracey | G06Q 20/405 |
| 2017/0300842 | A1* | 10/2017 | Pembery | G06Q 10/0639 |
| 2017/0323299 | A1* | 11/2017 | Davis | G06Q 20/204 |
| 2018/0253746 | A1 | 9/2018 | Tietzen et al. | |
| 2018/0300722 | A1* | 10/2018 | Matthews | G06Q 20/40 |
| 2019/0095898 | A1* | 3/2019 | Bhatia | G06Q 20/227 |
| 2019/0259018 | A1* | 8/2019 | Jain | G06Q 20/10 |
| 2020/0005351 | A1* | 1/2020 | Gupta | G06Q 30/0205 |
| 2020/0013102 | A1* | 1/2020 | Yeldham | G06F 16/29 |
| 2020/0193436 | A1* | 6/2020 | Matthews | G06Q 20/3224 |
| 2020/0311710 | A1* | 10/2020 | Laracey | G06Q 30/0253 |
| 2022/0172210 | A1* | 6/2022 | Henderson | G06Q 30/0185 |
| 2022/0300093 | A1* | 9/2022 | Jorasch | A63F 13/26 |
| 2023/0060863 | A1* | 3/2023 | Yie | G06F 3/1219 |
| 2023/0102389 | A1* | 3/2023 | Raghavan | G06Q 10/20 705/7.39 |
| 2023/0133829 | A1* | 5/2023 | Kumar | G16H 20/10 705/2 |
| 2023/0169618 | A1* | 6/2023 | Bellman | G08B 13/22 705/325 |
| 2023/0170087 | A1* | 6/2023 | Holder | G16H 50/20 705/2 |
| 2023/0177590 | A1* | 6/2023 | Sridhar | G06N 7/01 705/26.7 |
| 2023/0214746 | A1* | 7/2023 | Evangelopoulos | G06Q 10/08726 705/7.25 |
| 2023/0317281 | A1* | 10/2023 | Biedinger | G16H 40/67 705/3 |
| 2023/0325812 | A1* | 10/2023 | Campos | G06Q 20/363 705/26.8 |
| 2023/0325832 | A1* | 10/2023 | Malasi | G06Q 20/065 705/64 |
| 2023/0334501 | A1* | 10/2023 | Matthews | G06Q 20/4015 |
| 2023/0385707 | A1* | 11/2023 | Roy | G06N 20/20 |
| 2024/0265111 | A1* | 8/2024 | Lee | G06F 21/577 |

OTHER PUBLICATIONS

Bhardwaj, Ashish, "Comparison of Various Recommendation Techniques Employing Location Based Services for E-Commerce Website", M.Tech (Geoinformatics), May 2022, 88 pages.

Bourg et al., "Enhancing shopping experiences in smart retailing", Journal of Ambient Intelligence and Humanized Computing, Jun. 16, 2020, 19 pages.

Athey et al., "Bitcoin Pricing, Adoption, and Usage: Theory and Evidence", Stanford Institute for Economic Policy Research, Aug. 2016, 71 pages.

Melinn, Cathal, "Offline-Online Attribution with Google Maps", Digital Marketing Institute, Oct. 29, 2018, 6 pages.

* cited by examiner

200

202

208

MERCHANTS 204

PAYMENT MODES 206

302

TIMELINE GRAPH

PAYMENT MODE 1

PAYMENT MODE 2

PAYMENT MODE 3

SUCCESSFUL

NO TRANSACTION

FAILED

8:00 AM  10:00 AM  12:00 PM  2:00 PM  4:00 PM  6:00 PM  8:00 PM

1000

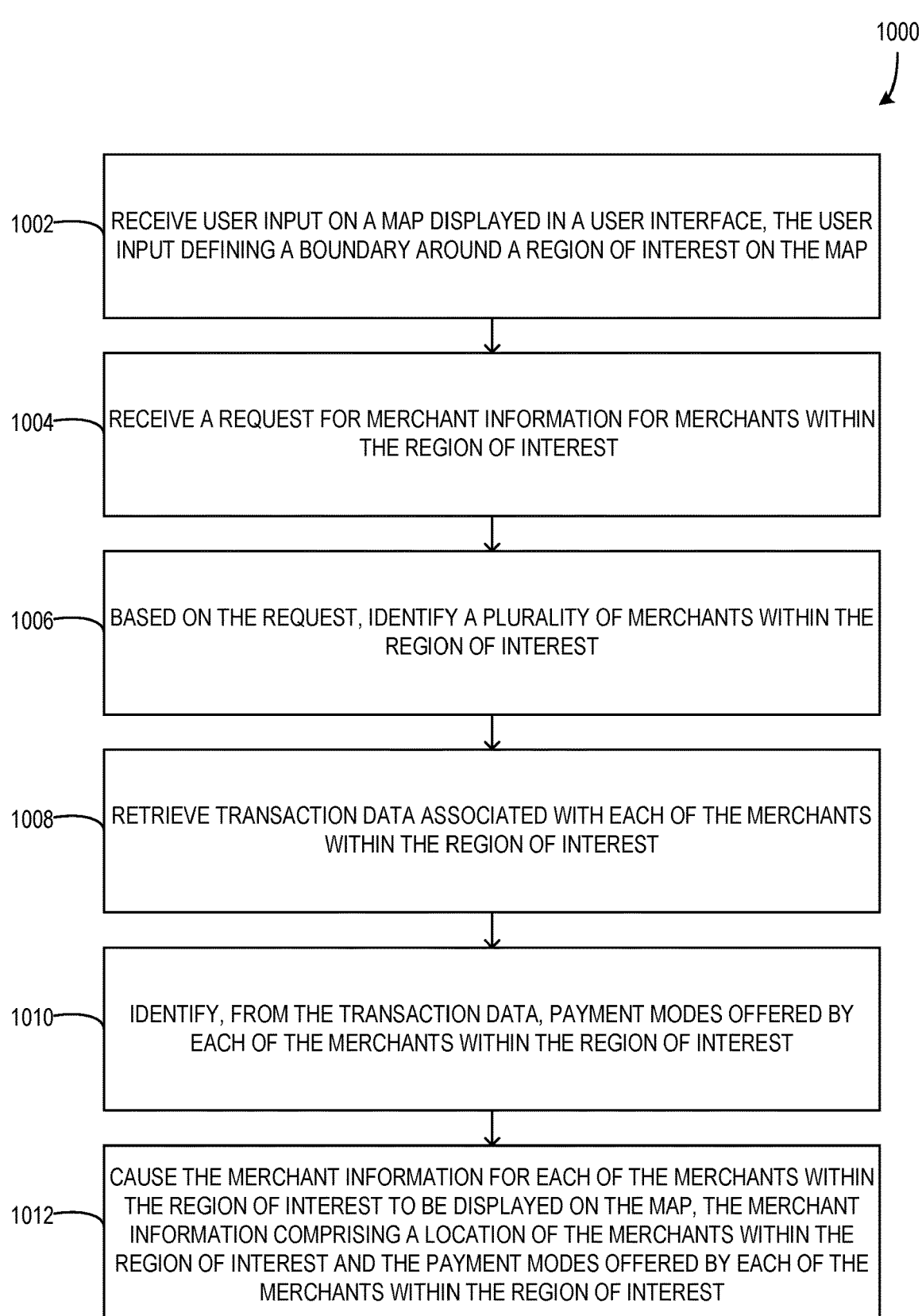

1002 — RECEIVE USER INPUT ON A MAP DISPLAYED IN A USER INTERFACE, THE USER INPUT DEFINING A BOUNDARY AROUND A REGION OF INTEREST ON THE MAP

1004 — RECEIVE A REQUEST FOR MERCHANT INFORMATION FOR MERCHANTS WITHIN THE REGION OF INTEREST

1006 — BASED ON THE REQUEST, IDENTIFY A PLURALITY OF MERCHANTS WITHIN THE REGION OF INTEREST

1008 — RETRIEVE TRANSACTION DATA ASSOCIATED WITH EACH OF THE MERCHANTS WITHIN THE REGION OF INTEREST

1010 — IDENTIFY, FROM THE TRANSACTION DATA, PAYMENT MODES OFFERED BY EACH OF THE MERCHANTS WITHIN THE REGION OF INTEREST

1012 — CAUSE THE MERCHANT INFORMATION FOR EACH OF THE MERCHANTS WITHIN THE REGION OF INTEREST TO BE DISPLAYED ON THE MAP, THE MERCHANT INFORMATION COMPRISING A LOCATION OF THE MERCHANTS WITHIN THE REGION OF INTEREST AND THE PAYMENT MODES OFFERED BY EACH OF THE MERCHANTS WITHIN THE REGION OF INTEREST

FIG. 10

ENHANCING TRANSACTIONS WITH LOCATION-BASED INSIGHTS ON PAYMENT MODES

BACKGROUND

Merchants provide customers multiple ways in which to provide a payment for goods and/or services rendered by the merchants. For example, customers may complete a purchase of a product by using, for example, mobile payments (e.g., a digital wallet), swiping their credit card at a point-of-sale location, and/or tapping/bumping their financial product against a payment terminal of the merchant employing near-field communication technology. Some options for providing a payment are not yet widely available or are offered in locations that have limited access to the Internet.

Despite the many available methods to complete a purchase, customers are left un-informed regarding the capabilities merchants have with respect to modes of payment the merchants accept in a particular location. This lack of insight into the modes of payments being offered by particular merchants increases when potential customers are not familiar with the particular merchants or the area surrounding the particular merchants.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to enhancing payment success with location-based insights. A method according to one aspect comprises receiving user input on a map displayed in a user interface (UI), the user input defining a boundary around a region of interest on the map; receiving a request for merchant information for merchants within the region of interest; based on the request, identifying a plurality of merchants within the region of interest; retrieving transaction data associated with each of the merchants within the region of interest; identifying, from the transaction data, payment modes offered by each of the merchants within the region of interest; and displaying, on the map, the merchant information for each of the merchants within the region of interest, the merchant information comprising a location of the merchants within the region of interest and the payment modes offered by each of the merchants within the region of interest.

BRIEF DESCRIPTION OF THE DRAWINGS

The present description will be better understood from the following detailed description read in light of the accompanying drawings, wherein:

FIG. 10 is a flow chart illustrating exemplary operations involving generating location and payment mode data from merchant transactions and applying the generated data to an interactive map for enhancing payment success.

Corresponding reference characters indicate corresponding parts throughout the drawings. In the figures, the systems are illustrated as schematic drawings. The drawings may not be to scale. Any of the drawings may be combined into a single example or embodiment.

DETAILED DESCRIPTION

Figure 1:
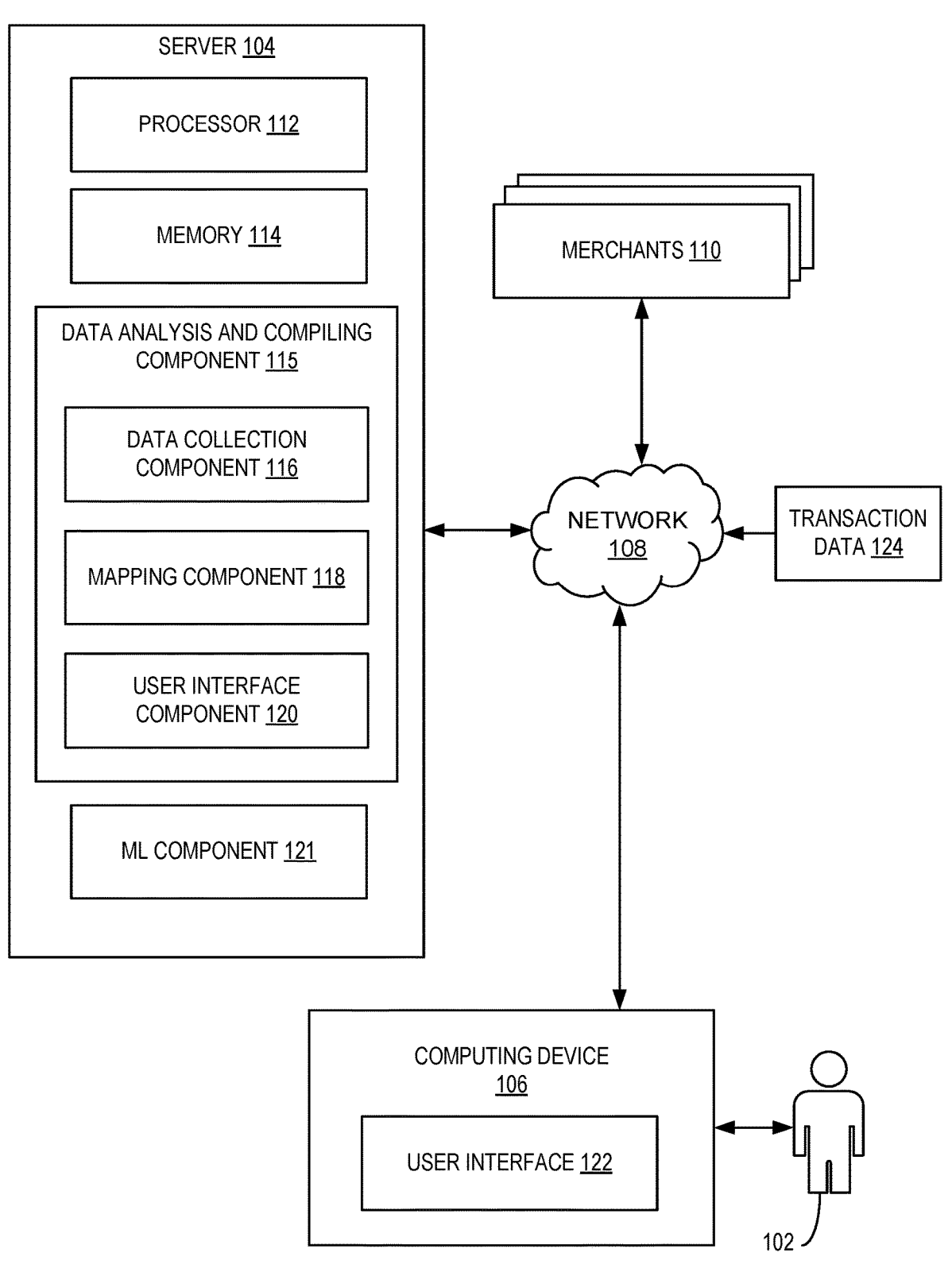
FIG. 1 is a block diagram illustrating a system according to an example.

Aspects of the disclosure provide systems and methods for enhancing transaction success with location-based insights. In some examples, the disclosure includes a user interface component that provides insights with respect to modes of payments offered by merchants within a particular region of interest defined by a user within the user interface. Aspects of the disclosure enable access to historic and/or real time transaction data from merchants within the region of interest, including a success rate for transactions associated with each mode of payment offered by the merchants. Aspects of the disclosure provide improvements in user accessibility and user interaction with a computer by making various functions and information accessible from a single user interface, at least by enabling a user to view, at a glance, which merchants offer particular modes of payment as well as the success rate for the particular modes of payment offered by the merchants within a region of interest defined by the user.

The disclosure enables integration of data from multiple data sources, such as transaction data, location information, user preferences, and map data to form one integrated data set (e.g., a single database) from which insights are provided. Aspects of the disclosure integrate data from multiple sources at least by obtaining coordinates of a boundary of a region of interest and the transaction data records from merchants to identify which merchants are within the region of interest, and thereafter providing information regarding the merchants within the region of interest to a user, such as, modes of payments offered by the merchants and a success rate with respect to transactions using each mode of payment offered by the merchants. The information requested and/or provided to the user is displayed in a user interface in a user-friendly way, thereby providing various types of useful information to the user at a glance.

Conventionally, computer users are limited in the ways in which they can organize or even visualize map icons on their display. Additionally, maps may have a large number of similar icons being displayed making it difficult to distinguish between similar icons outside of location alone. Further, when icons represent similar buildings/products/services, the difficulty to distinguish between these icons is exacerbated. Still further, conventionally, if a user wanted a non-typical arrangement or display of icons, the user would need to manually manipulate the icons on their display. For example, if a user wanted to know which merchants offer particular modes of payment within a particular area as well as the success rate for the particular modes of payment within the particular area, a map would not be suitable for at least the reasons presented above. Rather, conventionally, the user would be presented with a list of merchants on a webpage and the user may be required to manually select each merchant to learn more about the modes of payment they offer or any other information the user would like to obtain about each merchant.

Accordingly, the disclosure addresses these technical issues by providing a system and method for enabling a user to view, on a map and at a glance, which merchants offer particular modes of payment as well as the success rate for the particular modes of payment within a region of interest. In one example, a size of an icon representing a merchant is automatically determined by a processor and/or by a machine learning (ML) component that tracks success rates for each transaction conducted by the merchant over a period of time (e.g., day, week, month, etc.). In another example, a color and/or transparency of an icon representing a merchant is automatically determined by the processor and/or by the ML component that tracks different modes of payment each merchant offers over the period of time (e.g., day, week, month, etc.).

Advantageously, aspects of the disclosure use less memory, have a reduced processing load, and use less bandwidth at least by filtering the amount of information provided to the user while still providing the user with the information the user has requested, thereby improving the functioning of the underlying device. The disclosure performs data analysis at least by integrating different types of data, and displaying individual icons that represent the different types of data in a map to a user in a user interface, thereby improving interaction between the user and the device.

Aspects of the disclosure further include notifying a merchant of a particular payment mode that should be offered, based on the analysis described herein. For example, if a majority of merchants in an area of interest offer a particular payment mode, then the disclosure sends a suggestion to the other merchants in the area of interest to offer that payment mode. In another example, if a particular payment mode has a low success rate for completing a transaction in a particular area of interest, the disclosure notifies the merchants within the area of interest with a suggestion to consider removing that particular payment mode to save technical resource usage.

FIG. 1 is a block diagram illustrating a system 100 configured to process transaction data and user input to generate data for enhancing payment success with location-based insights from the data. In some examples, the system 100 generally includes a server 104, a computing device 106, and a plurality of merchants 110, each coupled to network 108.

A user 102 is further illustrated, and the user 102 is associated with the computing device 106, such as, for example, a smartphone or tablet that provides a user interface 122 that enables the user 102 to interact with the server 104. The user 102 may include, for example, a purchaser, an institutional purchaser, a business, or any other entity that purchases products, including, e.g., goods or services, etc. Further, it should be appreciated that the system 100 is provided for illustrative purposes only and should not be understood to limit the present disclosure. Different arrangements of the system 100 may be employed in other examples. For example, while the data analysis and compiling component 115, which includes the data collection component 116, the mapping component 118, and the user interface component 120 is shown as being embodied on the server 104, in other examples, one or more of the data collection component 116, the mapping component 118, and the user interface component 120 are separate from the data analysis and compiling component 115 and/or the server 104.

The network 108 may include, without limitation, a local area network (LAN), a wide area network (WAN) (e.g., the Internet, etc.), a mobile network, a virtual network, and/or another suitable public and/or private network capable of supporting communication among two or more of the components illustrated in FIG. 1, or even combinations thereof. For example, network 108 may include multiple different networks, such as a private payment transaction network made accessible by a payment network to an acquirer and an issuer (not shown), and separately, a public network (e.g., the Internet), which the plurality of merchants 110, the server 104 and/or the computing device 106 may access.

In the exemplary system 100, the data analysis and compiling component 115, and more specifically, the user interface component 120, the mapping component 118, and the data collection component 116 cooperate in response to a request from the user 102. For example, the user interface component 120 is enabled to present payment mode information for different merchants on the user interface 122 based on a request from the user 102. For example, with a rise in various types of payments modes, it can be difficult to identify types of payment modes particular merchants offer. This problem is exacerbated when the user 102 is not familiar with an area and/or is not familiar with a particular merchant. For example, during vacation to a specific location, the user 102 may not be aware of types of payment modes accepted by merchants in the specific location and this becomes even more complex in remote areas with limited internet connectivity. In these situations, the user 102 does not know whether a digital wallet is acceptable or if the user 102 must carry different cards or get an offline wallet loaded in case a merchant does not have sufficient connectivity to the Internet or is not accepting certain payment modes. As such, the user 102 may request payment mode information with respect to one or more of the plurality of merchants 110, and in response to the request, the user interface component 120 accesses transaction data 124 for one or more of the plurality of merchants 110 from the data collection component 116 and/or from the transaction data 124 stored in memory 114.

Figure 2:
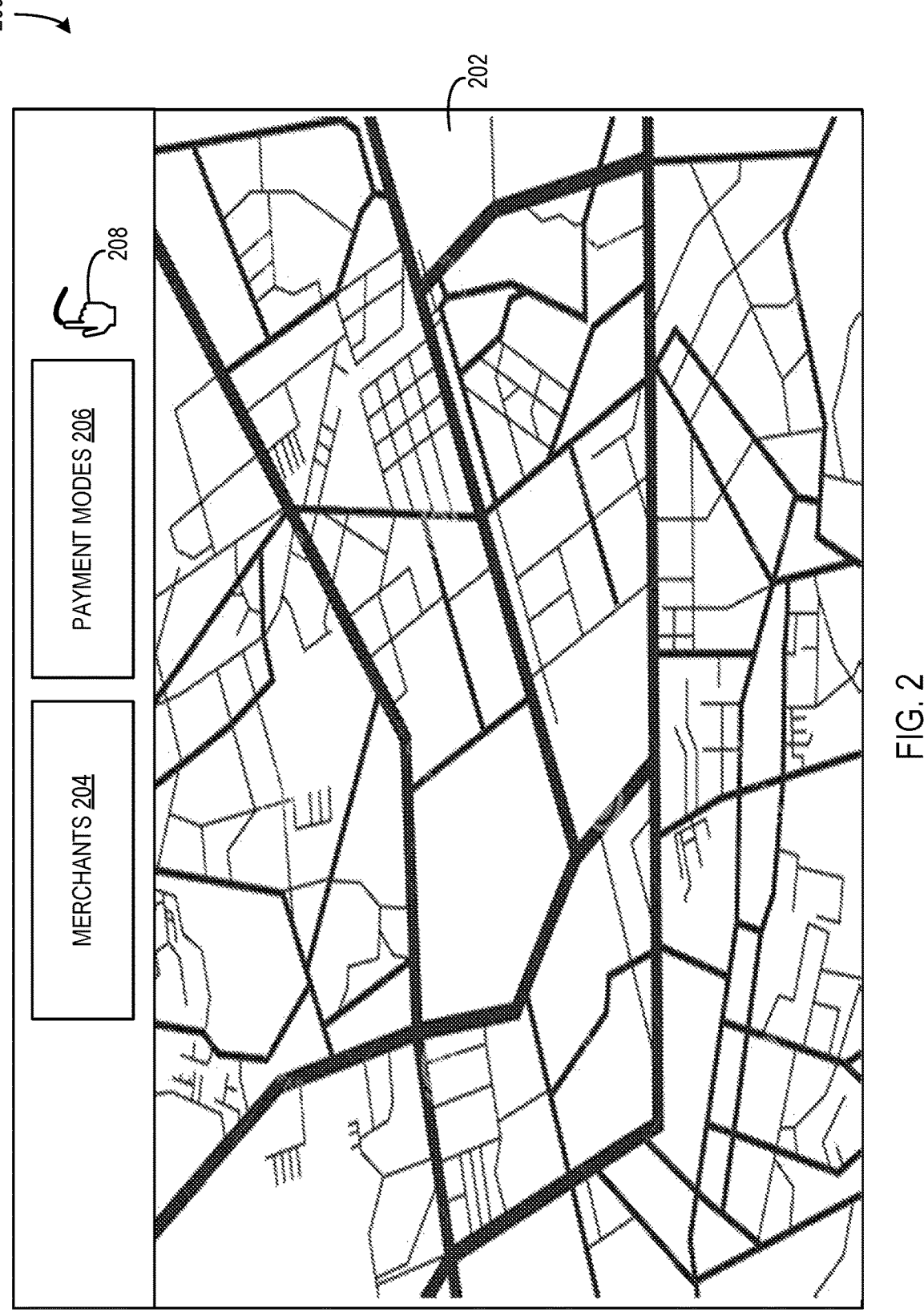
FIGS. 2-7 are exemplary user interfaces illustrating an interactive map.

With reference now to FIG. 2, an exemplary user interface 200 illustrating an interactive map 202 is provided. As shown in FIG. 2, the user 102 is presented with the user interface 200 that includes the interactive map 202 along with selection options comprising merchants 204, payment modes 206, and drawing tool 208. In one example, to enable the user 102 to request payment mode information with respect to one or more of the plurality of merchants 110, the mapping component 118 and/or the user interface component 120 provides the user 102 with the drawing tool 208. Upon selection by the user 102, the drawing tool 208 enables the user 102 to draw (e.g., using a finger of the user 102 or a device such as a pen), on the interactive map 202, a region of interest. The user 102 would like to know more information regarding merchants (e.g., from the plurality of merchants 110) within the region of interest.

Figure 3:

For example, as shown in FIG. 3, the user interface 200 illustrates a selection, by the user 102, of a region of interest 302 having been drawn by the user 102 using the drawing tool 208. In some examples, upon the user 102 defining the region of interest 302 using the drawing tool 208, the user 102 selects a type of information the user 102 would like to obtain about the region of interest 302. To this end, the mapping component 118 and/or the user interface component 120 provides the user 102 with the ability to select the type of information the user 102 would like to be presented with on the interactive map 202. For example, the user 102 is presented with selection options, such as the merchants 204 and the payment modes 206, that, upon a selection, send a request to the user interface component 120 to provide the user 102 with information specific to the selections(s) within the region of interest 302. Further, while the only selection options presented on the user interface 200 in the following examples are the merchants 204 and the payment modes 206, additional selection options may also be provided.

In one example, upon a selection by the user 102 of the merchants 204 and/or the payment modes 206, a request is sent to the mapping component 118 and/or the user interface component 120 to provide the user 102 with information regarding the selection(s). As such, the user 102 is enabled to advantageously limit a search of the plurality of merchants 110 to any of the plurality of merchants 110 that reside within the region of interest 302 as well as the payment modes offered by the plurality of merchants 110 that reside within the region of interest 302. Advantageously, this reduces the processing load on the data analysis and compiling component 115, and less bandwidth is used at least by filtering the amount of information provided to the user 102 while still providing the user 102 with the information the user 102 has requested, thereby improving the functioning of the underlying device (e.g., the server 104 and/or the computing device 106).

In some examples, upon the user 102 selecting the merchants 204, a request is sent to the user interface component 120 to identify each of the one or more of the plurality of merchants 110 that reside within the region of interest 302. Upon receiving the request, to identify which of the plurality of merchants 110 reside within the region of interest 302, the user interface component 120 accesses the transaction data 124 from the plurality of merchants 110 via the data collection component 116. That is, in some examples, the transaction data 124 includes information that enables the mapping component 118 to identify a physical location of a merchant within the region of interest 302, based at least on transactions corresponding to the transaction data 124. The transactions were executed at a physical location of the plurality of merchants 110. In some examples, each transaction in the transaction data 124 comprises multiple data fields, such as one or more of the following: transaction value, volume, location information of the transaction, date and time of the transaction, whether the transaction is online or offline, and a payment mode of the transaction. In other examples, the data collection component 116 extracts and collects the transaction data 124 from the plurality of merchants 110 in real time and/or periodically and stores the transaction data 124 in the memory 114. In this example, the user interface component 120 accesses some or all of the transaction data 124 from the memory 114. In some examples, the data collection component 116 collects payment activity from the transaction data 124 for the one or more of the identified plurality of merchants 110. In one example, the data collection component 116 collects payment activity data from a predefined period of time. For example, the data collection component 116 collects payment activity data from the past 24-hour period, the last week, the last month, the last several months or a portion of the past 24-hour period, the last week, the last month, the last several months.

When the transaction data 124 is received by the data collection component 116 directly from the one or more of the plurality of merchants 110 and/or when the transaction data 124 is accessed from the memory 114 by the data collection component 116 or the user interface component 120, the transaction data 124 is provided to the mapping component 118. In one example, the location information within the transaction data 124 is the only data provided to the mapping component 118. In some examples, the mapping component 118 either determines the coordinates of the boundary around the region of interest 302 on the interactive map 202 or the mapping component 118 accesses the coordinates from a third-party mapping application that provides the coordinates of the perimeter of the region of interest 302.

In some examples, the mapping component 118 uses the location information within the transaction data 124 and the coordinates of the boundary around the region of interest 302 to determine which of the one or more of the plurality of merchants 110 are within the boundary around the region of interest 302. For example, when the ISO 8583 standard is followed for message transmission and reception during the transaction, the mapping component 118 can access/determine the coordinates of the boundary around the region of interest 302 and accesses pin codes based on DE 43 Card acceptor name/location (1-23 street address, -36 city, -38 state, 39-40 country) using the transaction data 124 and the particular point of sale devices used for transactions that correspond to the transaction data 124.

In some examples, the mapping component 118 uses a reverse geocoding mechanism for converting latitude and longitude coordinates into human-readable addresses or location-based information. For example, various map application programming interfaces (APIs) available on various map application platforms can be used to fetch relevant lists of pin codes associated with that latitude and longitude. Thus, in some examples, the mapping component 118 converts the latitude and longitude coordinates into pin codes or requests (from a third-party application) pin codes associated with the latitude and longitude coordinates.

An exemplary list of latitude and longitude data is shown below:

| Latitude, longitude |
| --- |
| 35.929673, −78.948311 |
| 34.800321, −77.343112 |
| 35.909353, −78.980062 |
| 33.819643, −72.542213 |
| 32.315500, −68.547122 |
| 38.125664, −66.774521 |
| 38.144352, −74.987154 |
| 36.900653, −78.765445 |
| 35.665432, −71.808122 |
| 31.765112, −71.734112 |
| 35.898712, −70.635354 |

A result of the conversion of the above latitude and longitude coordinates is a list of pin codes that corresponds to each of the above latitudes and longitudes. An exemplary list of pin codes generated/converted from the above latitude and longitude coordinates is shown below:

| Pin codes |
| --- |
| 412207, 411006 |
| 412208, 411012 |
| 412214, 411016 |
| 412215, 411006 |
| 412212, 411004 |
| 412333, 411002 |
| 412341, 411001 |
| 412221, 410006 |
| 410006, 410008 |
| 412202, 411023 |
| 412204, 411024 |

In one example, after the pin codes have been accessed from the memory 114 or a map API, or after the pin codes have been generated from the mapping component 118, the pin codes are used to identify merchants associated with the pin codes, for example, by identifying one or more of the plurality of merchants 110 within the region of interest 302 that have registered in or operate in one or more of the pin codes. In addition to accessing the transaction data 124 from the plurality of merchants 110 based on transactions being executed at a physical location of the plurality of merchants 110, the data collection component 116 may use a web crawler to collect data corresponding to payment modes a merchant advertises or lists/provides on their website. The web crawler automatically extracts data from websites on the Internet and/or a web scraper gathers information from web pages by sending hypertext transfer protocol (HTTP) requests to web servers, retrieving web content, and then parsing and extracting the data from the parsed web content.

In some examples, once the location and identity of the one or more of the plurality of merchants 110 within the region of interest 302 are identified, the user interface component 120 causes a display of icons in the user interface 200 that represent each of the one or more of the plurality of merchants 110 that reside within the region of interest 302. For example, with reference now to FIG. 4, icons 402 representing each of the one or more of the plurality of merchants 110 that reside within the region of interest 302 are provided on the interactive map 202 in the user interface 200. As such, the user 102 can view the interactive map 202 and easily ascertain a location of each merchant represented by the icons 402, as well as how many of the plurality of merchants 110 that are within the region of interest 302 that accept the payment modes requested by the user 102.

In other examples, the user 102 may request, via the user interface 122, an identification of payment modes offered by each of the plurality of merchants 110 within the region of interest 302, for example, by the selection of the payment modes 206. In this example, the user 102 may filter the payment modes in order to select one or more payment modes that the user would like to obtain more information on. For example, the selection of the payment modes 206 enables a drop-down menu of all of the payment modes offered by each of the plurality of merchants 110 within the region of interest 302. As such, the user may select all of the payment modes, or limit a search to only certain payments modes from the drop-down list. In this example, after the selection of the payment modes 206 (which may include the filtering of particular payment modes), and as shown in FIG. 5 in updated interactive map 502, the interactive map 202 is updated to indicate which of the plurality of merchants 110 within the region of interest 302 offer the payment mode(s) selected by the user 102. In some examples, only the plurality of merchants 110 that offer a mode of payment or particular modes of payments selected by the user 102 are shown on the updated interactive map 502. That is, as shown in FIG. 5, there are fewer icons (e.g., the icons 402) than what is displayed in FIG. 4. Thus, based on the user 102 request for merchants that offer the certain payment mode (s), fewer merchants offer the certain payment mode(s) and the interactive map 502 is updated to reflect which merchants within the region of interest 302 offer the certain payment mode(s) and leave off the merchants that do not offer the certain payment mode(s). In other examples, the plurality of merchants 110 within the region of interest 302 that offer a particular mode of payment or the certain payment mode(s) selected by the user 102 are shown in a particular color while each of the other merchants shown in the updated interactive map 502 that do not offer the particular mode of payment or the certain payment mode(s) have no color but are still displayed.

Figure 6:
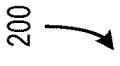

Referring now to FIG. 6, the user interface component 120 may cause icons representing each of the plurality of merchants 110 that offer the particular mode payment or the certain payment mode(s) within the region of interest 302 to vary in size based on whether or not the plurality of merchants 110 within the region of interest 302 offer the particular mode of payment or how many of the certain payment mode(s) each of the plurality of merchants 110 within the region of interest 302 offer. That is, in the example shown in FIG. 6, the greater the size of an icon (e.g., icon 604) indicates that a particular merchant represented by the icon 604 offers the particular mode of payment or the greater the size of the icon indicates that the particular merchant offers more of the certain payment mode(s) than other merchants that have smaller icons (e.g., icon 606).

Figure 7:
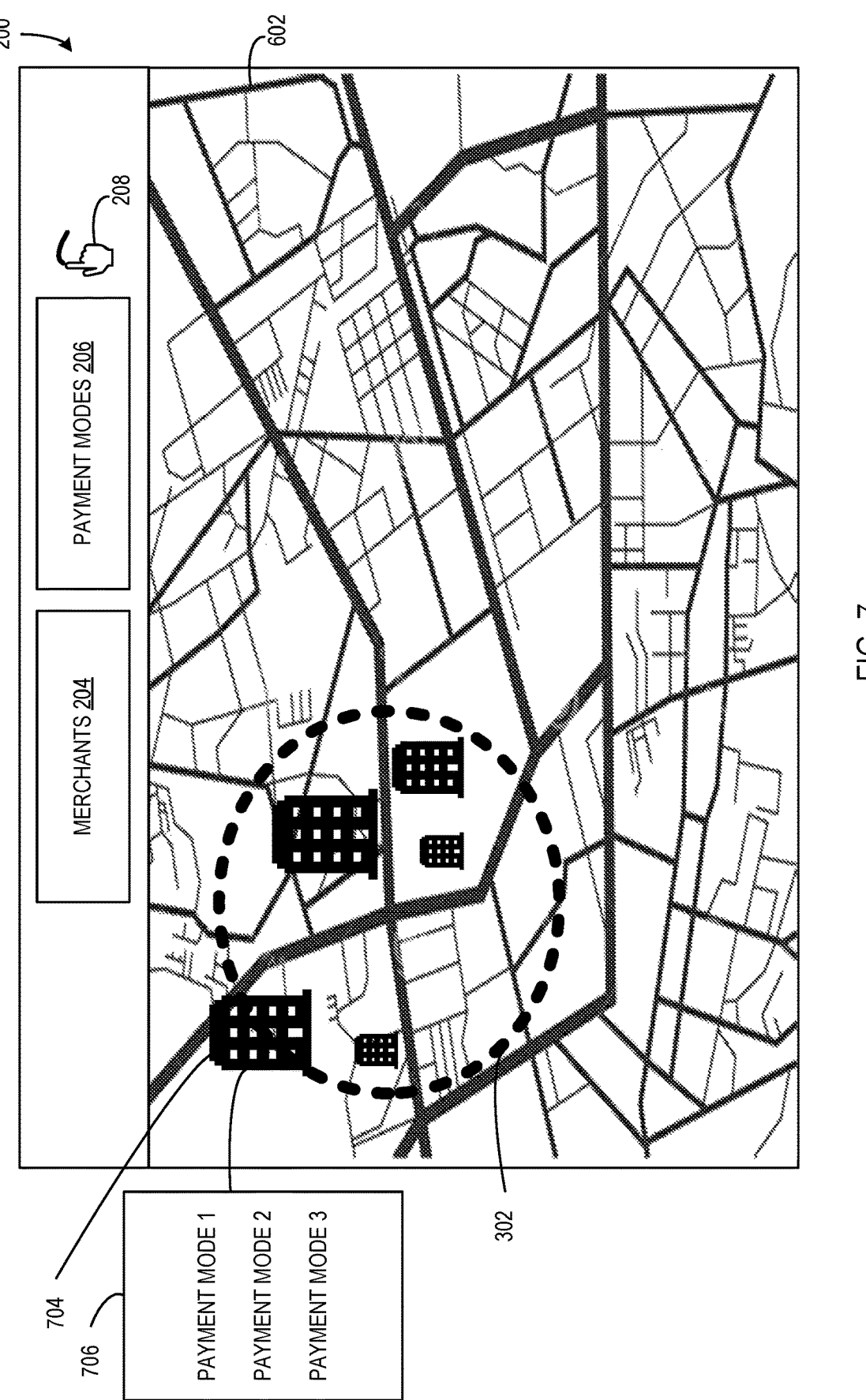

In some examples, in addition to, or in place of varying a size of each icon, the updated interactive map 602 enables the user 102 to hover over or select a particular merchant icon, for example, an icon for merchant 704 shown in FIG. 7, and as a result, a list of payment modes offered by the merchant 704 is provided in table 706. In some examples, and as explained in further detail below, the size of the icons representing each of the merchants offering the certain payment mode(s) directly correspond to a success rate of the certain payment mode(s) in contrast to the size of the icons representing the payment mode(s) offered by each of the plurality of merchants 110 within the region of interest 302.

Figure 8:
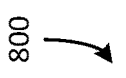
FIG. 8 is an exemplary timeline graph of payment mode success and failure times.

In some examples, the data collection component 116 identifies payment types/modes from the collected payment activity data. In addition, the data collection component 116 identifies, from the collected payment activity data, each transaction that was successful and each transaction that failed during a predefined period of time. As explained above, the period of time from which this information is obtained from may be the past 24-hour period, the last week, the last month, the last several months or a portion of the past 24-hour period, the last week, the last month, the last several months Based on the information obtained by the data collection component 116, in some examples, the user interface component 120 provides, to the user interface 122, a timeline graph 800 as shown in FIG. 8, indicating, for transactions of the one or more identified merchants 110, times transactions succeeded, and times transactions failed for particular payment modes. For example, as shown in FIG. 8, three payment modes are illustrated, payment mode 1, payment mode 2, and payment mode 3. The timeline graph 800 provides an indication as to whether each of the payment mode 1, the payment mode 2, and the payment mode 3, had a successful transaction, had no transactions, or had a failed transaction between 8:00 AM and 8:00 PM on a particular day. For example, the timeline graph 800 shows that transactions corresponding to payment mode 1 were always successful between 8:00 AM and 8:00 PM. The timeline graph 800 further shows that the payment mode 2 was successful at 12:00 PM and 8:00 PM, and had no transactions corresponding thereto at 8:00 AM, 10:00 AM, and from 2:00 PM to 6:00 PM. The timeline graph 700 further shows that the payment mode 3 failed at 8:00 AM, 12:00 PM, 4:00 PM and 8:00 PM, was successful at 10:00 AM, and had no transactions corresponding thereto at 2:00 PM and 6:00 PM. Thus, the user 102 can easily ascertain, from the timeline graph 800, which payment modes are successful or have failed during particular times of day on a particular day.

Figure 4:
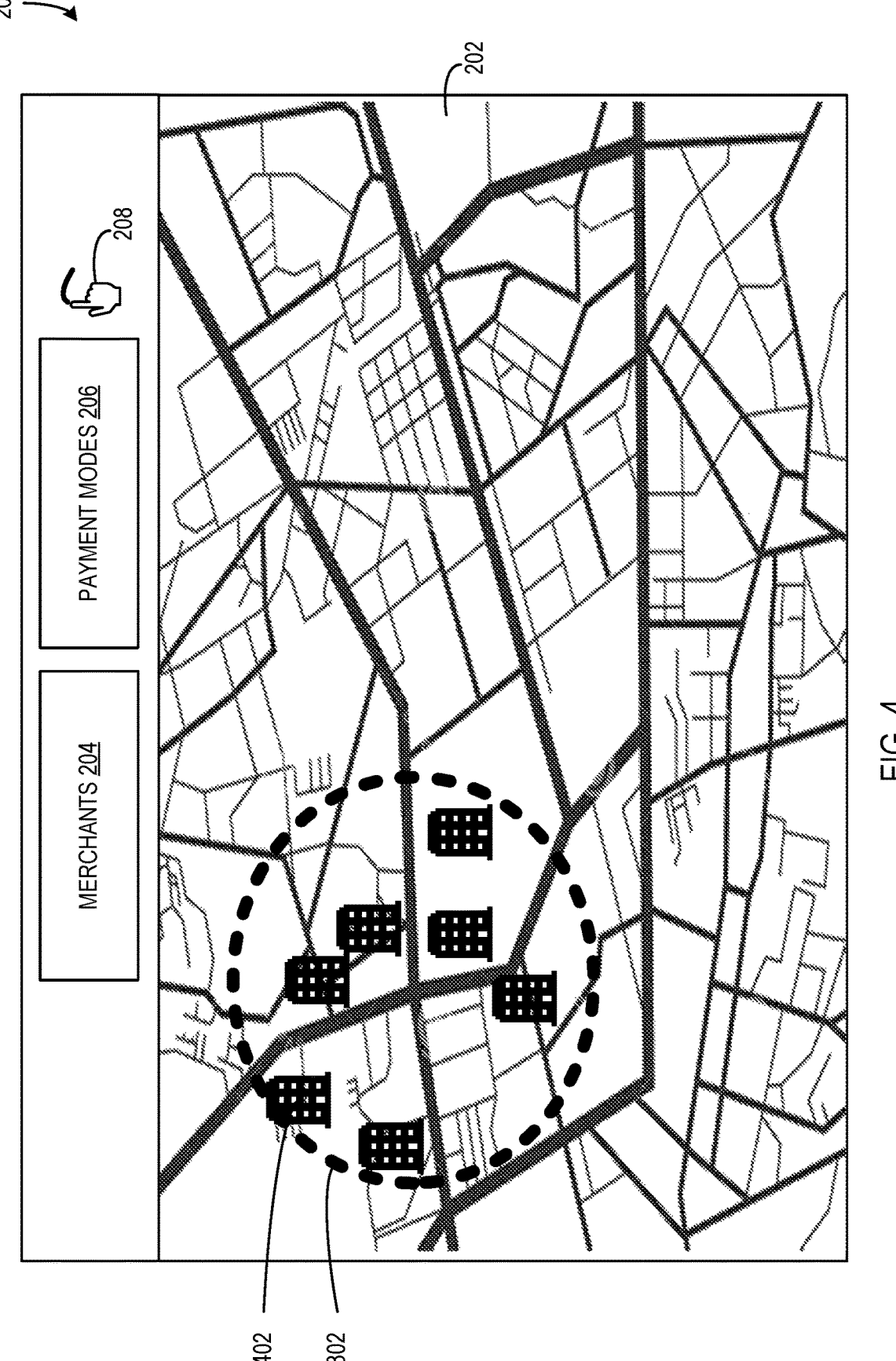
Figure 5:
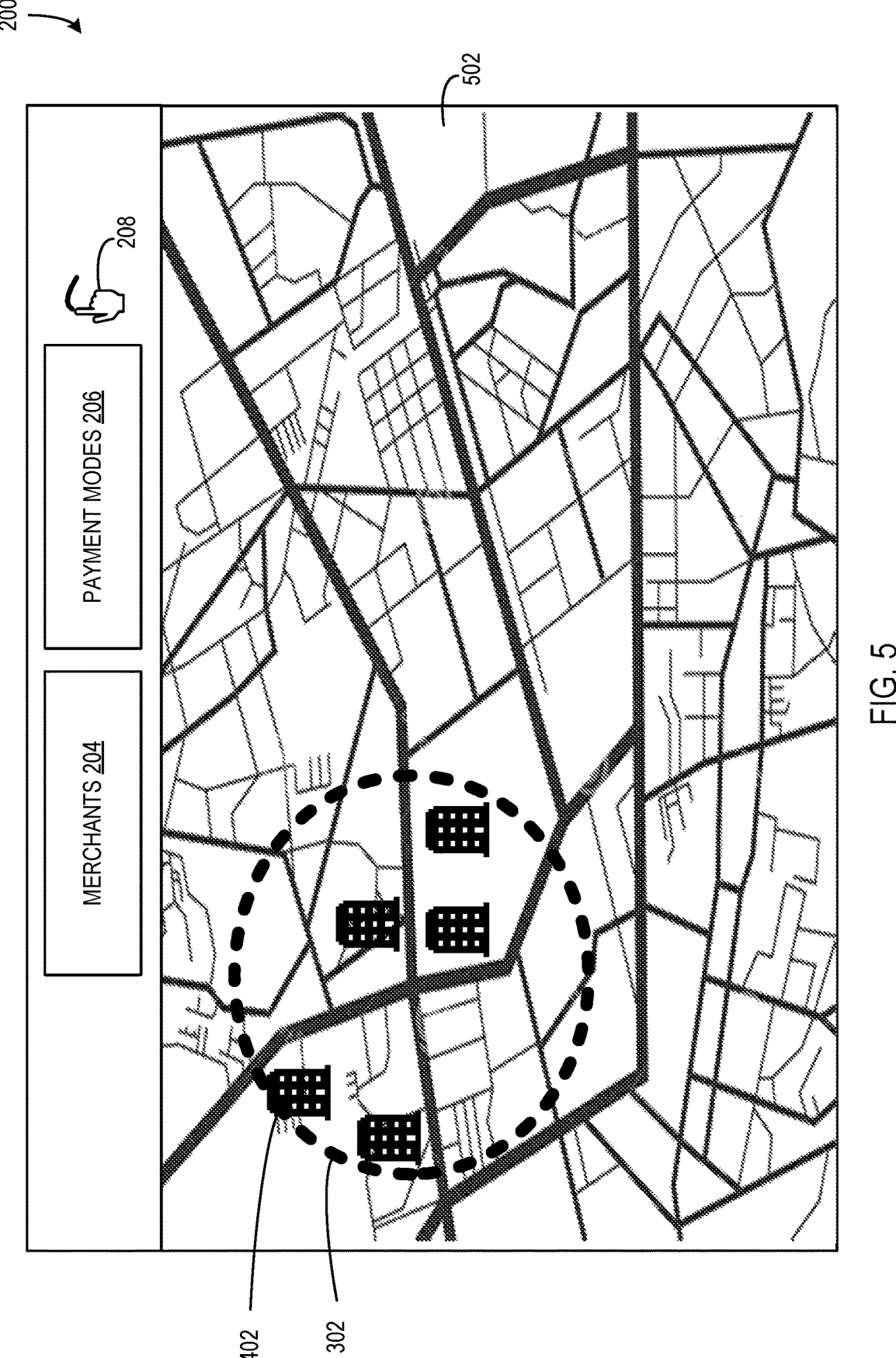
Figure 9:
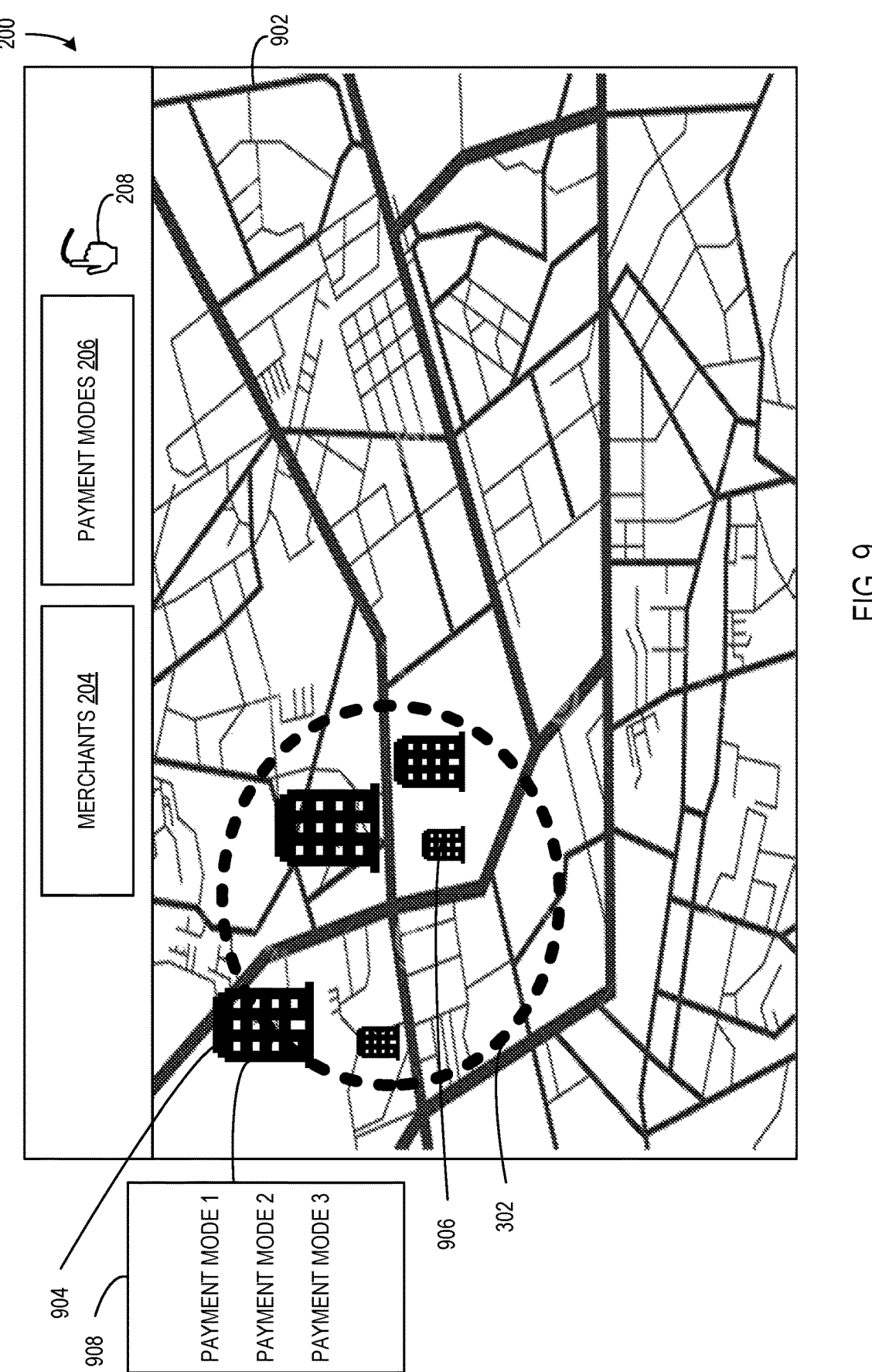
FIG. 9 is an exemplary user interface illustrating an interactive map.

With reference now to FIG. 9, in some examples, in addition to, or in place of, providing the user 102 with the timeline graph 800, the user interface component 120 provides, to the user interface 122, an updated interactive map 902 that is an update to the interactive map 202 shown in FIG. 4. In the updated interactive map 902, the visual representations of the one or more of the plurality of merchants 110 (e.g., the icons 904, 906 in FIG. 9) are shown to be different sizes and color. For example, icon 904 is larger than icon 906. In one example, a size of the icon representing a merchant on the updated interactive map 902 illustrates success rates for the merchant represented by the icon. For example, the larger the icon, the greater the average success rate is for payment modes the merchant offers. In some examples, in addition to, or in place of varying a size of each icon, the updated interactive map 902 enables the user 102 to hover over or select a particular merchant icon, for example the icon 904, and as a result, a list of success rates for each of the payment modes offered by the merchant represented by the icon 904 is provided in the table 908. In some examples the timeline graph 800 is provided as a result of the hover or selection. In another example, similar to the list of payment modes in table 706 in FIG. 7, a list of payment modes offered by the merchant represented by the icon 904 is provided in table 908, as a result of the hover or selection of the icon 904. In another example, a color of the icons within the region of interest 302 in the updated interactive map 902 vary in color (or transparency) to represent the different modes of payment offered by each of the merchants within the region of interest 302. As a result, a single user interface (e.g., the user in interface 200) enables the user 102 to see, at a glance, which merchants of the plurality of merchants 110 within the region of interest 302 offer particular modes of payment as well as the success rate for the particular modes of payment within the region of interest 302 that was defined by the user 102.

In some examples, the user interface component 120 is configured to obtain and present inferences associated with the user 102 selections, such as a type of payment, region of interest, and future dates of interest for the region of interest as explained in further detail below. The user interface component 120 selects appropriate data visualization tools and techniques depending on the nature of data and the user's preferences. These tools and techniques include charts, graphs, tables, diagrams, text, etc. These are examples and the presentation is not limited to these formats. The information to be presented can be customized based on the user's preferences that are selected by the user or learned via the ML component 121.

In some examples, the user interface component 120 allows the user to customize the presentation format, layout, and content. For example, the user may select which types of merchants are presented and how to display them (locations on map, top to bottom, left to right, etc.). In some examples, the layout, format, and content are automatically selected and arranged based on historic user preferences. After initial use and customization, the ML component 121 analyzes the user's interactions and identifies use patterns. Based on the identified use patterns, the layout, format, and content of the presentation are determined. In some embodiments, the user interface component 120 displays merchants and types of payment based on the frequency of appearance on the user's search. For example, based on the frequency of search, the most frequently searched merchants and/or types of payments are displayed. In some other examples, the ML component 121 determines the user's pattern of interacting with the user interface 122, and the ML component 121 displays merchant information based on the frequency of the user's interaction with previous merchant information provided on the user interface 122. That is, the ML component 121 analyzes a pattern of user's behavior and reflect it to a display. For example, if the user frequently searches for a particular payment mode that is offered by merchants, then merchants that offer that particular payment mode are automatically displayed in the user interface 122 larger than other merchants displayed and/or in a prominent place, such as the top of the user interface 122. In some embodiments, the user frequently selects to view success rate statistics after viewing which merchants offer particular payments modes, as such, the user interface 122 may prompt the user to view the success rate statistics.

In other examples, when ML techniques are used, the data collection component 116 pushes the collected payment activity to the ML component 121 or the ML component 121 requests the collected payment activity. In some examples, it is the ML component 121 that generates the timeline graph 700 and the interactive map 902 illustrating the visual representations of the one or more of the plurality of merchants 110 being color coded to illustrate types of payments each of the one or more of the plurality of merchants 110 offer, as well as illustrating the types of payments and success rates of the types of payments. In some examples, the ML component 121 provides real time statistics with respect to probabilities of success for transactions based on historic data from the data collection component 116. That is, rather than providing an average success rate for each type of payment over the last 24-hour period, the ML component 121 provides current probabilities in real time. The ML component 121 may be trained with training data generated from the data with the data collection component 116 and the memory 114. In other examples, the ML component 121 predicts success rates of payment modes for merchants based on future data given by the user 102. That is, when the user 102 selects the region of interest, the user may also select a date in which the user desires to visit the region of interest. In this example, the ML component 121 provides data that is consistent with the selected date based on the ML component 121 being trained with training data generated from the data with the data collection component and the memory 114. For example, the ML component 121 is initially trained with historic transaction data and the ML component 121 is fine-tuned as it processes more data, such as new transaction data and feedback data from users.

In some embodiments, the ML component 121 includes a machine learning module that comprises a trained regressor such as a random decision forest, a directed acyclic graph, a support vector machine, a convolutional neural network, or other neural network, or another trained regressor. Such a trained regressor may be trained using the historic transaction data and the feedback data.

In an example, the ML component 121 makes use of training data pairs when applying machine learning techniques and/or algorithms. Millions of training data pairs (or more) may be stored in a machine learning data structure. In some examples, a training data pair includes historic payment modes and success rates for the payment modes (e.g., during particular dates/times). The pairing of the two values determines future adjustments according to machine learning techniques and/or algorithms.

In some embodiments, the ML component 121 is trained in an unsupervised manner. The ML component 121 finds pattern from a group of users or from a single user (e.g., the user 102) to automatically display or recommend particular information. In some examples, the ML component 121 uses unsupervised machine learning techniques to create clusters with input and output data. In some embodiments, clustering techniques such as k-means clustering, hierarchical clustering, mean shift clustering, and density-based clustering are used.

FIG. 10 is a flow chart illustrating exemplary operations involving generating location and payment mode data from merchant transactions and applying the generated data to an interactive map for enhancing payment success for a user. At 1002, user input is received on a map (e.g., the interactive map 202 shown in FIG. 2) displayed in a user interface (e.g., the user interface 122), the user input defining a boundary around a region of interest (e.g., the region of interest 302 shown in FIG. 3) on the interactive map 202. For example, the mapping component 118 and/or the user interface component 120 provides the user 102 with the drawing tool 208 that, upon selection by the user 102, enables the user 102 to draw (e.g., using a finger of the user 102 or a device such as a pen), on the interactive map 202, the region of interest. The region of interest 302 represents a region in which the user 102 requests a search for merchants (e.g., from the plurality of merchants 110).

At 1004, a request for merchant information for merchants (e.g., the plurality of merchants 110) within the region of interest 302 is received. For example, the user 102 is presented with selection options, such as the merchants 204 and the payment modes 206 shown in FIG. 2, that, upon a selection by the user 102, send a request to the user interface component 120 to provide the user 102 with information specific to the selections(s) within the region of interest 302. As a result of the request, at 1006, a plurality of merchants within the region of interest 302 is identified and transaction data associated with each of the merchants within the region of interest is retrieved at 1008. In one example, the transaction data includes transaction history information for transactions initiated at each of the merchants within a defined period of time. That is, in some examples, the transaction data 124 includes information that enables the mapping component 118 to identify a physical location of a merchant within the region of interest 302. This is based at least on transactions (corresponding to the transaction data 124) that were executed at a physical location of the plurality of merchants 110. In some examples, each transaction in the transaction data 124 comprises multiple data fields, such as one or more of the following: transaction value, volume, location information of the transaction, date and time of the transaction, whether the transaction is online or offline, and a payment mode of the transaction. In one example, identifying each merchant within the region of interest 302 includes identifying coordinates of the boundary of the region of interest 302, comparing the location information with the coordinates of the boundary of the region of interest, and based on the comparing, identifying each of the merchants within the region of interest. In one example, upon receiving the request, in order to identify which of the plurality of merchants 110 reside within the region of interest 302, the user interface component 120 accesses the transaction data 124 from the plurality of merchants 110 via the data collection component 116.

When the transaction data 124 is received by the data collection component 116 directly from the one or more of the plurality of merchants and/or when the transaction data 124 is accessed from the memory 114 by the data collection component 116 or the user interface component 120, the transaction data 124 is provided to the mapping component 118. In one example, the location information within the transaction data is the only data provided to mapping component 118. In some examples, the mapping component 118 either determines the coordinates of the boundary around the region of interest on the map or the mapping component 118 accesses the coordinates from the third-party mapping application that provides the coordinates of the perimeter of the region of interest 302.

In some examples, the mapping component 118 uses the location information within the transaction data 124 and the coordinates of the boundary around the region of interest to determine which of the one or more of the plurality of merchants 110 are within the boundary around the region of interest 302. For example, the mapping component 118 accesses/determines the coordinates of the boundary around the region of interest and accesses pin codes based on the transaction data 124 and the particular point of sale devices used for transactions that correspond to the transaction data 124. In some examples, the mapping component 118 converts the latitude and longitude coordinates into pin codes or requests (from a third-party application) pin codes associated with the latitude and longitude coordinates. In one example, the pin codes are used to identify merchants associated with the pin codes, for example, by identifying one or more of the plurality of merchants 110 within the region of interest have registered in/with one or more of the pin codes.

At 1010, payment modes offered by each of the plurality of merchants 110 within the region of interest 302 are identified from the transaction data 124. In one example, each of the transactions initiated correspond to a particular payment mode, and based on the transaction history information, the payment modes offered by each of the plurality of merchants 110 within the region of interest 302 within the defined period of time are identified. For example, the data collection component 116 collects payment activity data from the past 24-hour period, the last week, the last month, the last several months or a portion of the past 24-hour period, the last week, the last month, the last several months.

At 1012, the merchant information for each of the plurality of merchants 110 within the region of interest 302 is caused to be displayed on the interactive map 202. In one example, the merchant information includes a location of the plurality of merchants 110 within the region of interest 302 and the payment modes offered by each of the plurality of merchants 110 within the region of interest 302. For example, once the location and identity of the one or more of the plurality of merchants 110 within the region the region of interest 302 are identified, the user interface component 120 causes a display of icons that represent each of the one or more of the plurality of merchants 110 that reside within the region of interest 302. For example, the icons (e.g., the icons 402 shown in FIG. 4) representing each of the one or more of the plurality of merchants 110 that reside within the region of interest 302 are provided on the interactive map 202 in the user interface 200. As such, the user 102 can view the interactive map 202 and easily ascertain a location of each merchant represented by the icons 402, as well as how many of the merchants 110 that are within the region of interest 302 accept the payment modes requested by the user 102.

In one example, an emphasized version of each merchant in the region of interest is displayed on the interactive map 202 based on the set of criteria from the user 102. In one example, the emphasizing of each merchant is performed by one or more of the following: changing a size of an icon representing each merchant in the region of interest that offers one or more of the preferred payment modes; and color coding each merchant in the region of interest that exceeds the success rate threshold for the one or more preferred payment modes.

For example, with respect to payment modes offered by each of the merchants within the region of interest, the interactive map 202 is updated to indicate which of the plurality of merchants 110 within the region of interest 302 offer payment mode(s) selected by the user 102. In some examples, only the plurality of merchants 110 that offer a mode of payment or particular modes of payments selected by the user 102 are shown in an updated interactive map (e.g., the updated interactive map 502 shown in FIG. 5). In other examples, the plurality of merchants 110 within the region of interest 302 that offer the particular mode of payment, or the particular modes of payments selected by the user 102 are shown in a particular color while each of the other merchants shown in the updated interactive map 502 that do not offer the particular mode of payment or the particular modes of payment have no color.

For example, icons representing each of the plurality of merchants 110 that offer the particular mode payment or the particular modes of payments offered by each of the plurality of merchants 110 within the region of interest 302 may vary in size based on whether or not the plurality of merchants 110 within the region of interest 302 offer the particular mode of payment or how many of the particular modes of payment each of the plurality of merchants 110 within the region of interest 302 offer. That is, in the example shown in FIG. 6, the greater the size of an icon (e.g., icon 604) indicates that the particular merchant represented by the icon offers the particular mode of payment or the greater the size of the icon indicates that the particular merchant offers more of the particular modes of payments than other merchants that have smaller icons (e.g., icon 606). In some examples, in addition to, or in place of varying a size of each icon, the updated interactive map 602 enables the user 102 to hover over or select a particular merchant icon, for example, an icon for merchant 704 shown in FIG. 7, and as a result, a list of payment modes offered by the merchant 704 is provided in table 706. In some examples, and as explained in further detail below, the size of the icons representing each of the merchants offering the particular form of payment(s) would directly correspond to a success rate of the particular form of payment(s) in contrast to the payment mode(s) offered by each of the plurality of merchants 110 within the region of interest 302.

In another example, still referring to 1012, the merchant information for each of the plurality of merchants 110 within the region of interest 302 that is caused to be displayed on the interactive map 202 is a success rate for the transactions initiated at each of the plurality of merchants 110 in the region of interest 302 within the defined period of time. This information is determined from the transaction history information, and based on the determining, a success rate for each of the payment modes offered by each of the plurality of merchants 110 within the region of interest 302 within the defined period of time is displayed for each of the plurality of merchants 110 within the region of interest 302. In some examples, a request to organize the merchant information based on a set of criteria is received from the user 102 via the user interface 200. The set of criteria includes one or more of the following: one or more preferred payment modes, a success rate threshold for the one or more preferred payment modes, payment modes most frequently used by the user 102, previous selected criteria by the user 102, and/or types of merchants. In some examples, the user interface component 120 provides, to the user interface 122, a timeline graph 800 as shown in FIG. 8, indicating, for transactions of the one or more identified merchants 110, number of times transactions succeeded, and number of times transactions failed for particular payment modes. In some examples, in addition to, or in place of, providing the user 102 with the timeline graph 800, the user interface component 120 provides, to the user interface 122, an updated interactive map 902 (shown in FIG. 9) that is an update to the interactive map 202 shown in FIG. 4. In the updated interactive map 902, the visual representations of the one or more of the plurality of merchants 110 (e.g., the icons 904, 906 in FIG. 9) are shown in different sizes and/or color. In another example, similar to the list of payment modes in table 706 in FIG. 7, a list of payment modes offered by the merchant represented by the icon 904 is provided in table 908. In another example, a color of the icons within the region of interest 302 in the updated interactive map 902 varies in color to represent the different modes of payment offered by each of the plurality of merchants 110 within the region of interest 302. As a result, a single user interface (e.g., the user in interface 200) enables the user 102 to see, at a glance, which merchants offer particular modes of payment as well as the success rate for the particular modes of payment within the region of interest 302 that was defined by the user 102.

In some examples, a number of users searching a portion of the region of interest within a period of time is identified. In one example, when the number of users identified exceeds a threshold number, the plurality of merchants 110 in the region of interest 302 are notified of a footfall percentage of customers expected in the portion of the region of interest during a period of time. That is, while the data analysis and compiling component 115 collects and/or provides the transaction data 124 upon the request from the user 102, the data analysis and compiling component 115 also obtains information from the user 102 that is beneficial to the plurality of merchants 110 within the region of interest 302. And more specifically, the data analysis and compiling component 115 obtains, from the request from the user 102, a particular time of day as well as a particular date the user 102 is interested in visiting the region of interest 302. In some examples, the particular time of day and/or the particular date is provided by the user 102 as a set of criteria to focus the merchant information with the region of interest 302 to times/dates the user is interested in visiting the region of interest 302. As such, the information provided to the user 102 is more focused and more relevant to the user 102. However, in some examples, the user 102 does not explicitly indicate a time of day or a date the user would like the merchant information to be obtained from (or predicted by the ML component 121 if the date and time is a future date and time), and as such, the data analysis and compiling component 115 along with the ML component 121 can infer particular dates and times the user 102 may be visiting the region of interest 302 (e.g., from travel ticket bookings of the user), and more specifically, which of the plurality of merchants 110 within the region of interest 302 the user 102 may visit (e.g., from a list of items to purchase at the region of interest).

In addition to the information obtained/inferred from the user 102, the data analysis and compiling component 115 along with the ML component 121 obtains similar (or the same) information from all users that are searching for merchant information within the region of interest 302 or at least a portion of the region of interest 302. As such, the data analysis and compiling component 115 along with the ML component 121 determines how many users are likely to visit the region of interest 302 (or portion thereof) and/or how many users are likely to visit particular merchants within the region of interest 302 on a particular date (or range of dates) and/or during a particular time on the particular date. As such, in one example, the data analysis and compiling component 115 along with the ML component 121 can push this information to the plurality of merchants 110 within the region of interest 302, and as a result, the merchants 110 within the region of interest 302 are notified of a footfall percentage of customers expected in the portion of the region of interest during a period of time. As such, the plurality of merchants 110 within the region of interest 302 have a better understanding of staffing needs and/or product/services the merchants should have available during these dates/times.

In addition to, or in place of, providing the footfall percentage of customers expected in the portion of the region of interest during a period of time, the data analysis and compiling component 115 along with the ML component 121 can provide search information to the plurality of merchants 110 within the region of interest 302. That is, the search information provided to the plurality of merchants 110 within the region of interest 302 may include the types of payment modes users are requesting information on, with respect to which types of payment modes the plurality of merchants 110 within the region of interest 302 offer. As such, the plurality of merchants 110 within the region of interest 302 can better understand and/or better prepare with respect to the types of payment modes that users are requesting.

Additional Examples

Some aspects and examples disclosed herein are directed to a method comprising: receiving user input on a map displayed in a user interface, the user input defining a boundary around a region of interest on the map; receiving a request for merchant information for merchants within the region of interest; based on the request, identifying each merchant within the region of interest; retrieving transaction data associated with each of the merchants within the region of interest; identifying, from the transaction data, payment modes offered by each of the merchants within the region of interest; and causing the merchant information for each of the merchants within the region of interest to be displayed on the map, the merchant information comprising a location of the merchants within the region of interest and the payment modes offered by each of the merchants within the region of interest.

Some aspects and examples disclosed herein are directed to a system comprising: a memory; a processor; a user interface component that causes the processor to perform the following operations: receiving user input on a map displayed in a user interface, the user input defining a boundary around a region of interest on the map; receiving a request for merchant information for merchants within the region of interest; based on the request, identifying each merchant within the region of interest; retrieving transaction data associated with each of the merchants within the region of interest; identifying, from the transaction data, payment modes offered by each of the merchants within the region of interest; and displaying, on the map, the merchant information for each of the merchants within the region of interest, the merchant information comprising a location of the merchants within the region of interest and the payment modes offered by each of the merchants within the region of interest.

Some aspects and examples disclosed herein are directed to ne or more computer-readable media comprising computer-executable instructions that, when executed by a processor, cause the processor to perform the following operations: receiving user input on a map displayed in a user interface, the user input defining a boundary around a region of interest on the map; receiving a request for merchant information for merchants within the region of interest; based on the request, identifying each merchant within the region of interest; retrieving transaction data associated with each of the merchants within the region of interest; identifying, from the transaction data, payment modes offered by each of the merchants within the region of interest; and displaying, on the map, the merchant information for each of the merchants within the region of interest, the merchant information comprising a location of the merchants within the region of interest and the payment modes offered by each of the merchants within the region of interest.

Alternatively, or in addition to the other examples described herein, examples include any combination of the following:

wherein the transaction data comprises location information for point-of-sale devices wherein identifying each of the merchants comprises: identifying coordinates of the boundary; comparing the location information with the coordinates of the boundary; and based on the comparing, identifying each of the merchants within the region of interest, wherein the transaction data comprises transaction history information for transactions initiated at each of the of the merchants within a defined period of time, wherein each of the transactions initiated correspond to a particular payment mode; and based on the transaction history information, identifying the payment modes offered by each of the merchants within the region of interest within the defined period of time.

determining, from the transaction history information, a success rate for the transactions initiated at each of the merchants in the region of interest within the defined period of time; and based on the determining, displaying, for each of the merchants within the region of interest, a success rate for each of the payment modes offered by each of the merchants within the region of interest within the defined period of time.

receiving, via the user interface, a request to organize the merchant information based on a set of criteria, wherein the set of criteria comprises: one or more preferred payment modes, a success rate threshold for the one or more preferred payment modes; and based on the request, displaying, on the map, emphasized versions of each merchant in the region of interest based on the set of criteria.

wherein emphasizing comprises one or more of the following: changing a size of an icon representing each merchant in the region of interest that offers one or more of the preferred payment modes; and color coding each merchant in the region of interest that exceeds the success rate threshold for the one or more preferred payment modes.

identifying a number of users searching a portion of the region of interest within a period of time; determining that the number of users exceeds a threshold number; and notifying the merchants in the portion of the region of interest of a footfall percentage of customers expected in the portion of the region of interest during a second period of time.

Exemplary Operating Environment

Figure 11:
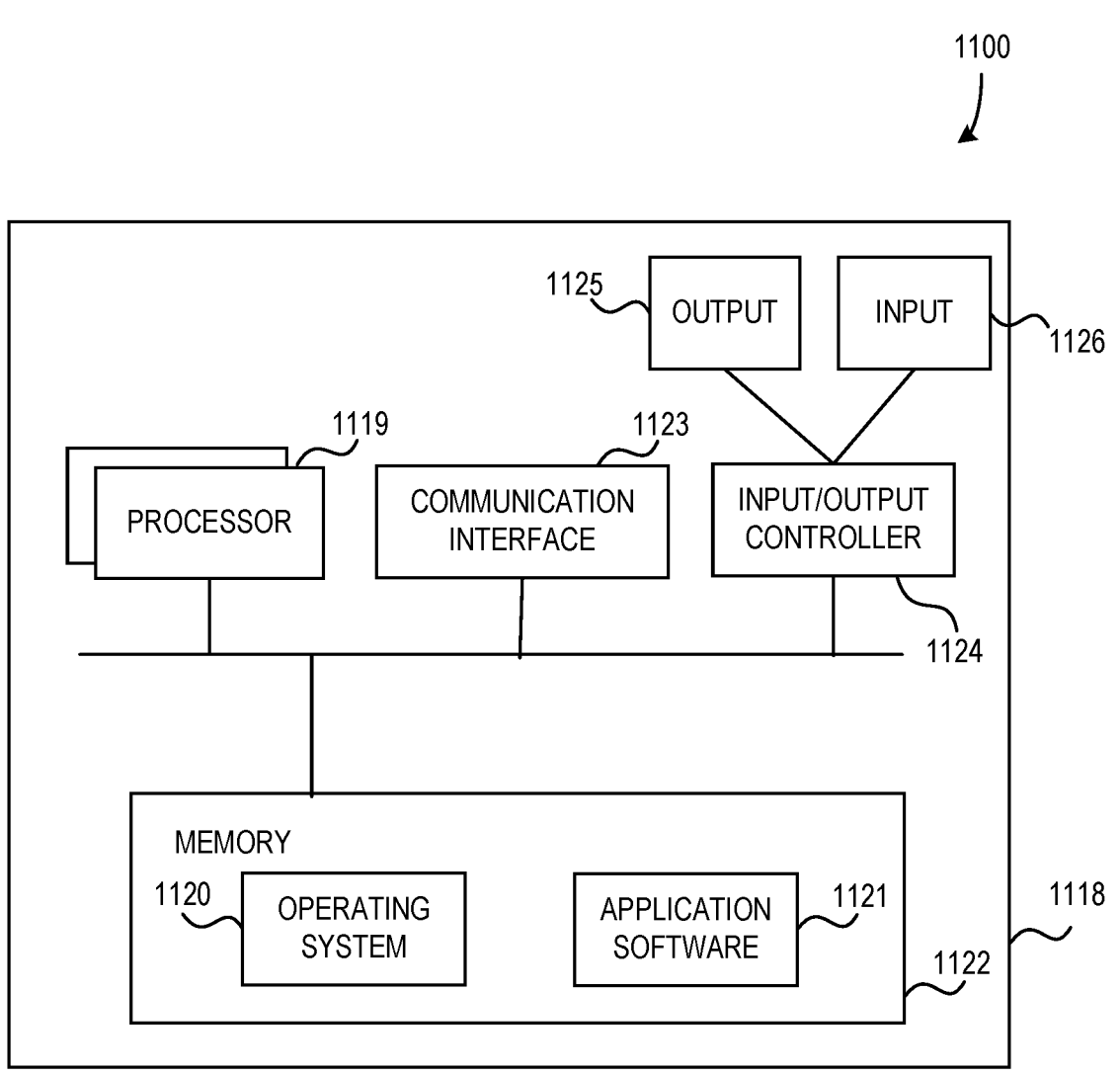
FIG. 11 illustrates a block diagram of an example computing environment suitable for implementing some of the various examples disclosed herein.

The present disclosure is operable with a computing apparatus according to an embodiment as a functional block diagram 1100 in FIG. 11. In an example, components of a computing apparatus 1118 are implemented as a part of an electronic device according to one or more embodiments described in this specification. The computing apparatus 1118 comprises one or more processors 1119 which may be microprocessors, controllers, or any other suitable type of processors for processing computer executable instructions to control the operation of the electronic device. Alternatively, or in addition, the processor 1119 is any technology capable of executing logic or instructions, such as a hard-coded machine. In some examples, platform software comprising an operating system 1120 or any other suitable platform software is provided on the apparatus 1118 to enable application software 1121 to be executed on the device.

In some examples, computer executable instructions are provided using any computer-readable media that is accessible by the computing apparatus 1118. Computer-readable media include, for example, computer storage media such as a memory 1122 and communications media. Computer storage media, such as a memory 1122, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals are not examples of computer storage media. Although the computer storage medium (the memory 1122) is shown within the computing apparatus 1118, it will be appreciated by a person skilled in the art, that, in some examples, the storage is distributed or located remotely and accessed via a network or other communication link (e.g., using a communication interface 1123).

Further, in some examples, the computing apparatus 1118 comprises an input/output controller 1124 configured to output information to one or more output devices 1125, for example a display or a speaker, which are separate from or integral to the electronic device. Additionally, or alternatively, the input/output controller 1124 is configured to receive and process an input from one or more input devices 1126, for example, a keyboard, a microphone, or a touchpad. In one example, the output device 1125 also acts as the input device. An example of such a device is a touch sensitive display. The input/output controller 1024 may also output data to devices other than the output device, e.g., a locally connected printing device. In some examples, a user provides input to the input device(s) 1126 and/or receives output from the output device(s) 1125.

The functionality described herein can be performed, at least in part, by one or more hardware logic components. According to an embodiment, the computing apparatus 1118 is configured by the program code when executed by the processor 1119 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed:

1. A computerized method for enhancing completion of a transaction, the method comprising:

receiving user input on a map displayed in a user interface, the user input defining a boundary around a region of interest on the map;

receiving a request for merchant information for merchants within the region of interest;

based on the request, identifying a plurality of merchants within the region of interest;

displaying, on the user interface, a non-emphasized icon for each respective one of the identified plurality of merchants;

retrieving transaction data associated with each of the plurality of merchants within the region of interest;

identifying, from the transaction data, payment modes offered by each of the plurality of merchants within the region of interest;

causing the merchant information for each of the plurality of merchants within the region of interest to be displayed on the map, the merchant information comprising a location of each of the plurality of merchants within the region of interest and the payment modes offered by each of the plurality of merchants within the region of interest;

receiving, via the user interface, a request to organize the merchant information based on a set of criteria, wherein the set of criteria comprises: one or more of a user preferred payment mode, and a user preferred payment mode success rate threshold; and based on the request, selectively adjusting the user interface such that, on the map, the non-emphasized icon of each merchant in the region of interest having merchant information that satisfies the set of criteria is replaced by an emphasized icon and the non-emphasized icon of each merchant in the region of interest having merchant information that does not satisfy the set of criteria is not replaced by the emphasized icon.

2. The method of claim 1, wherein the transaction data comprises location information for point-of-sale devices associated with the plurality of merchants.

3. The method of claim 2, wherein identifying the plurality of merchants comprises:

identifying coordinates of the boundary;

comparing the location information with the coordinates of the boundary; and based on the comparing, identifying each of the plurality of merchants within the region of interest.

4. The method of claim 1, wherein the transaction data comprises transaction history information for transactions initiated at each of the plurality of merchants within a defined period of time, wherein each of the transactions initiated corresponds to a particular one of the payment modes; and wherein the method further comprises:

based on the transaction history information, identifying the payment modes offered by each of the plurality of merchants within the region of interest within the defined period of time.

5. The method of claim 4, further comprising;

determining, from the transaction history information, a success rate for the transactions initiated at each of the plurality of merchants in the region of interest within the defined period of time; and based on the determining, displaying, for each of the plurality of merchants within the region of interest, a success rate for each of the payment modes offered by each of the plurality of merchants within the region of interest within the defined period of time.

6. The method of claim 1, wherein displaying the emphasized icon comprises one or more of the following:

changing a size of an icon representing each merchant in the region of interest that offers the user preferred payment mode; and color coding each merchant in the region of interest that exceeds the user preferred payment mode success rate threshold.

7. The method of claim 1, further comprising:

identifying a number of users searching a portion of the region of interest within a period of time;

determining that the number of users exceeds a threshold number; and notifying the plurality of merchants in the portion of the region of interest of a footfall percentage of customers expected in the portion of the region of interest during a second period of time.

8. The method of claim 1, comprising:

displaying, in response to a first user selection made on the user interface, at least one drop down list on the user interface;

receiving, via the user interface, a second user selection of a criterion that is included in the drop down list; and including the criterion in the set of criteria.

9. A system comprising:

a memory;

a processor; and a user interface component that causes the processor to perform the following operations:

receiving user input on a map displayed in a user interface, the user input defining a boundary around a region of interest on the map;

receiving a request for merchant information for merchants within the region of interest;

based on the request, identifying a plurality of merchants within the region of interest;

displaying, on the user interface, a non-emphasized icon for each respective one of the identified plurality of merchants;

retrieving transaction data associated with the plurality of merchants within the region of interest;

identifying, from the transaction data, payment modes offered by the plurality of merchants within the region of interest;

displaying, on the map, the merchant information for the plurality of merchants within the region of interest, the merchant information comprising a location of each of the plurality of merchants within the region of interest and the payment modes offered by each of the plurality of merchants within the region of interest;

receiving, via the user interface, a request to organize the merchant information based on a set of criteria, wherein the set of criteria comprises: one or more of a user preferred payment mode, and a user preferred payment mode success rate threshold; and based on the request, selectively adjusting the user interface such that, on the map, the non-emphasized icon of each merchant in the region of interest having merchant information that satisfies the set of criteria is replaced by an emphasized icon and the non-emphasized icon of each merchant in the region of interest having merchant information that does not satisfy the set of criteria is not replaced by the emphasized icon.

10. The system of claim 9, wherein the transaction data comprises location information for point-of-sale devices associated with the plurality of merchants.

11. The system of claim 10, wherein identifying plurality of the merchants comprises:

identifying coordinates of the boundary;

comparing the location information with the coordinates of the boundary; and based on the comparing, identifying each of the plurality of merchants within the region of interest.

12. The system of claim 9, wherein the transaction data comprises transaction history information for transactions initiated at each of the plurality of merchants within a defined period of time, wherein each of the transactions initiated correspond to a particular one of the payment modes; and wherein the user interface component further causes the processor to perform:

based on the transaction history information, identifying the payment modes offered by each of the plurality of merchants within the region of interest within the defined period of time.

13. The system of claim 12, wherein the user interface component further causes the processor to perform the following operations:

determining, from the transaction history information, a success rate for the transactions initiated at each of the plurality of merchants in the region of interest within the defined period of time; and based on the determining, displaying, for each of the plurality of merchants within the region of interest, a success rate for each of the payment modes offered by each of the plurality of merchants within the region of interest within the defined period of time.

14. The system of claim 13, wherein the user interface component further causes the processor to perform the following operations:

receiving a request to organize the merchant information based on a set of criteria, wherein the set of criteria comprises: one or more of a preferred payment mode, and a success rate threshold for the preferred payment mode; and based on the request, displaying, on the map, emphasized versions of each merchant in the region of interest based on the set of criteria.

15. The system of claim 14, wherein the user interface component causes the processor to display the emphasized versions by performing one or more of the following operations:

changing a size of an icon representing each merchant in the region of interest that offers the preferred payment mode; and color coding each merchant in the region of interest that exceeds the success rate threshold for the preferred payment mode.

16. One or more computer-readable media comprising computer-executable instructions that, when executed by a processor, cause the processor to perform the following operations:

receiving user input on a map displayed in a user interface, the user input defining a boundary around a region of interest on the map;

receiving a request for merchant information for merchants within the region of interest;

based on the request, identifying a plurality of merchants within the region of interest;

displaying, on the user interface, a non-emphasized icon for each respective one of the identified plurality of merchants;

retrieving transaction data associated with each of the plurality of merchants within the region of interest;

identifying, from the transaction data, payment modes offered by each of the plurality of merchants within the region of interest;

displaying, on the map, the merchant information for each of the plurality of merchants within the region of interest, the merchant information comprising a location of each of the plurality of merchants within the region of interest and the payment modes offered by each of the plurality of merchants within the region of interest;

receiving, via the user interface, a request to organize the merchant information based on a set of criteria, wherein the set of criteria comprises: one or more of a user preferred payment mode, and a user preferred payment mode success rate threshold; and based on the request, selectively adjusting the user interface such that, on the map, the non-emphasized icon of each merchant in the region of interest having merchant information that satisfies the set of criteria is replaced by an emphasized icon and the non-emphasized icon of each merchant in the region of interest having merchant information that does not satisfy the set of criteria is not replaced by the emphasized icon, wherein displaying the emphasized icon comprises one or more of the following:

changing a size of an icon representing each merchant in the region of interest that offers the user preferred payment mode, and color coding each merchant in the region of interest that exceeds the user preferred payment mode success rate threshold.

17. The one or more computer-readable media of claim 16, wherein the transaction data comprises location information for point-of-sale devices associated with the plurality of merchants.

18. The one or more computer-readable media of claim 17, wherein identifying the plurality of merchants comprises:

identifying coordinates of the boundary;

comparing the location information with the coordinates of the boundary; and based on the comparing, identifying each of the plurality of merchants within the region of interest.

19. The one or more computer-readable media of claim 16, wherein the transaction data comprises transaction history information for transactions initiated at each of the plurality of merchants within a defined period of time, wherein each of the transactions initiated correspond to a particular payment mode; and wherein the computer-executable instructions, when executed by a processor, cause the processor to further perform:

based on the transaction history information, identifying the payment modes offered by each of the plurality of merchants within the region of interest within the defined period of time.

20. The one or more computer-readable media of claim 19, wherein the one or more computer-readable media comprises further executable instructions, that when executed by the processor, further cause the processor to perform the following operations:

determining, from the transaction history information, a success rate for the transactions initiated at each of the plurality of merchants in the region of interest within the defined period of time; and based on the determining, displaying, for each of the plurality of merchants within the region of interest, a success rate for each of the payment modes offered by each of the plurality of merchants within the region of interest within the defined period of time.

\* \* \* \* \*